United States Patent

[11] 3,607,544

[72] Inventors Richard J. Earner
Claymont, Del.;
Raymond A. Thomas, Jr., Elkins Park, Pa.
[21] Appl. No. 820,382
[22] Filed Apr. 30, 1969
[45] Patented Sept. 21, 1971
[73] Assignee FMC Corp.
Philadelphia, Pa.

[54] MIXTURE OF STEAM, ALCOHOL AND POLYALKYLENEIMINE AS ADHESION PROMOTER FOR LAMINATES
5 Claims, 2 Drawing Figs.

[52] U.S. Cl. .................................................. 156/307,
156/308, 156/320, 156/322, 156/331
[51] Int. Cl. ..................................................... C09j 5/02,
C09j 5/06
[50] Field of Search .......................................... 156/307,
308, 320, 322, 326, 331; 161/227, 249, 254;
252/182; 260/2 EN, 239 E

[56] References Cited
UNITED STATES PATENTS
| 3,322,593 | 5/1967 | Conti | 156/307 |
| 3,355,347 | 11/1967 | Habermann | 161/189 |

FOREIGN PATENTS
| 574,553 | 4/1959 | Canada | 156/326 |

*Primary Examiner*—Harold Ansher
*Assistant Examiner*—Robert A. Dawson
*Attorneys*—Thomas R. O'Malley, George F. Mueller and Robert G. Hoffmann

ABSTRACT: A mixture of steam and a volatile alcohol incorporating an additive proportion of a polyalkyleneimine, a method of laminating using this mixture and a laminate prepared therewith, are disclosed herein.

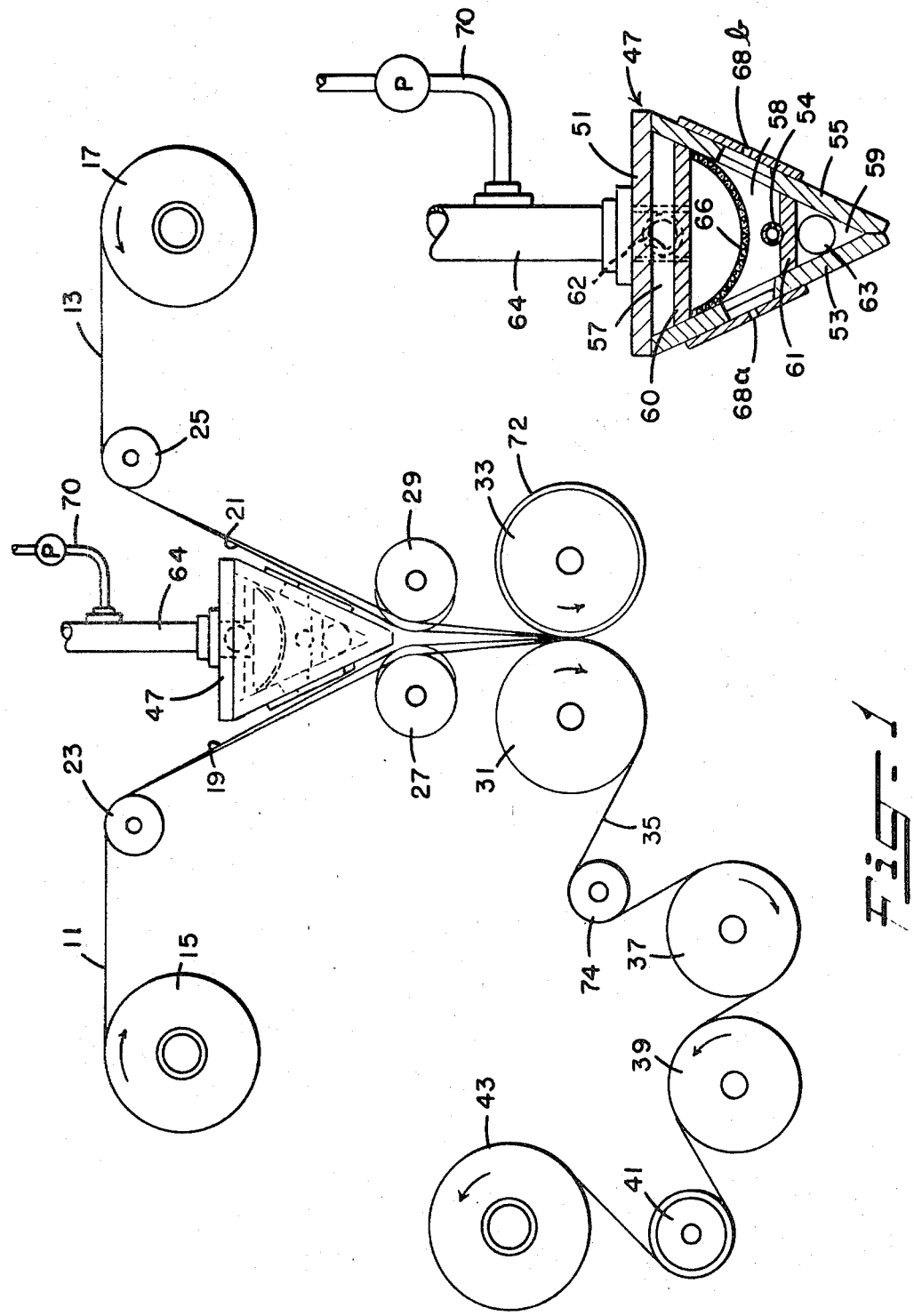

MIXTURE OF STEAM, ALCOHOL AND POLYALKYLENEIMINE AS ADHESION PROMOTER FOR LAMINATES

It is well known to employ polyalkyleneimine adhesion promoting coatings between sheets, foils, films and top coatings to improve the bond between the respective layers. The patent art is replete with disclosure of this procedure and includes for example, German Pat. No. 753,191; British Pat. Nos. 766,827 and 1,075,056; and U.S. Pat. Nos. 2,828,237, 2,887,405, 2,940,889 2,999,782, 3,009,831, 3,033,707, 3,140,196, 3,230,135, 3,297,476, and 3,418,204.

The art discloses that extremely thin layers of the polyalkyleneimines of specified minimum molecular weight will provide increased adhesion between layers of practically any two materials including metal foil, synthetic resin films and sheets, regenerated cellulose films, fabric, paper, glassine, and wood.

The polyalkyleneimine is applied to the substrate usually by diluting it with water, lower alkanol or other suitable volatile organic solvent and dipping, spraying or roll coating the substrate. After the adhesion promoter is applied it must be dried before laminating or coating in order to obtain the desired improvement in adhesion. This is usually accomplished by heating the substrate in a special chamber so that the carrier or solvent evaporates and the polyalkyleneimine is further polymerized.

A method and apparatus for laminating a pair of sheets, at least one of which comprises a nonfibrous, hydrophilic cellulosic substrate and at least one of which has a thermoplastic surface, which are to be joined together, is disclosed in U.S. Pat. No. 3,322,593 to J. D. Conti issued May 30, 1967. The method broadly comprises continuously advancing the pair of sheets relative to and in spaced relationship with the opposite sides of a heated stationary member whereby the adjacent thermoplastic surface or surfaces are heated to soften them, impinging moist steam directly against the opposing sides of the advancing sheets, then pressing the sheets together whereby the softened thermoplastic produces a bond between the opposed surfaces, and cooling the composite sheet.

The apparatus and method described in said Conti patent and the similar apparatus as disclosed in the C. R. Pepmeier application Ser. No. 637,519, filed May 10, 1967, now U.S. Pat. No. 3,467,313, are useful in laminating sheets wherein at least one of the substrates is a hydrophilic cellulosic film since heat lamination removes considerable moisture from said substrates and a certain amount of moisture in the substrate is necessary for satisfactory operability. Thus, the patented method and apparatus provide means for rapidly humidifying and laminating sheets containing hydrophilic substrates. However, there is a continuing need for means to strengthen the bond between thermoplastic sheets or layers, particularly of different composition, and need for improved methods of strengthening the bond.

It is an object of this invention to provide a composition which will strengthen the bond at the interface of at least one thermoplastic surface and another surface, to which it has been applied and which does not require drying periods or expensive drying equipment prior to lamination of the surfaces.

It is another object of this invention to provide a method of laminating surfaces at least one of which is thermoplastic.

It is further object to provide laminated sheets which incorporate novel adhesion promoters at the interface of the lamina.

These and other objects are accomplished in accordance with this invention comprising a mixture of steam and a volatile monohydroxy alcohol miscible therewith, and an additive amount of an adhesive promoting polyalkyleneimine.

The method of this invention comprises laminating two sheets together at least one of which has a nonfibrous thermoplastic resin surface by forwarding said sheets with the thermoplastic surface in opposed relationship to the other sheet into contact with one another, impinging a mixture of steam and a volatile monohydroxy alcohol containing an additive amount of an adhesion promoting polyalkyleneimine onto at least one of said surfaces just prior to said contact, and pressing said sheets together to provide a composite product.

The above method is advantageously carried out using the apparatus as disclosed in the above identified Conti patent or Pepmeier application and broadly claimed as a device comprising means including a hollow member for heating a pair of opposing sides of sheet material, at least one of said opposing sides being formed of thermoplastic materials, to soften said thermoplastic material, means for advancing the sheet materials relative to said heating means, means for impinging moist steam against at least one side of the pair of opposing sides simultaneously with the heating thereof, means for laterally spreading the moistened and heated sheet materials to remove wrinkles therefrom, means for pressing the heated sheet materials together while they are in laterally spread condition to provide a composite product, and means for cooling the product.

The accompanying drawing is a composite of the apparatus of the Conti patent utilizing the heated shoe and steam dispenser of the Pepmeier patent application.

FIG. 1 is an end view of the material features of the apparatus, and;

FIG. 2 is a vertical section of the heated shoe and steam dispenser.

Referring now to FIG. 1 of the drawing, sheets, at least one of which has a thermoplastic resin coating thereon, and at least one of which contains a hydrophilic cellulosic sheet, are indicated at 11 and 13 and are supplied from separate rolls 15 and 17 with coated side 19 disposed in opposing relationship with side 21 which can also be coated. These films are laced about guide rolls 23 and 25, engaged with curved or bowed spreader rolls 27 and 29 and then brought together and laminated by temperature and pressure rollers 31 and 33, respectively. The resulting composite or laminated product, indicated at 35, is cooled to at least room temperature by chill rollers 37 and 39, passed about a rubber-covered gripping or pull roll 41 and then collected in the form of a roll, as shown at 43.

The rolls 23 and 25 are idler rolls which are driven by the movement of the film 11 and 13. The spreader rolls 27 and 29, however, are together driven by a suitable source, not shown, to positively advance the films at a uniform rate of speed. In traveling from the guide rolls 23 and 25 to the spreader rolls 27 and 29, the opposing coated side or sides of the films 11 and 13 are softened by a heated shoe 47. As best shown in FIG. 2 the shoe 47 is of hollow construction and includes a top wall 1 and tapered or inclined sidewalls 53 and 55. Longitudinally extending chambers 57, 58 and 59 are formed in the hollow shoe by means of separating walls 60 and 61. Pipes 62 and 63 are provided at one end of the shoe to deliver and recover high-pressure steam into chamber 57 and out of chamber 59, respectively, thereby effectively heating the walls of shoe 47. Pipe 54 is used to drain condensed moisture from chamber 58. Chamber 58 is sealed at both ends so that the high-pressure steam does not pass therethrough.

Humidification of the hydrophilic sheet 11 and/or 13 is effected concomitantly with the heating thereof by moist steam which is impinged against the opposing sides thereof. More specifically, one or more pipes 64 supply moist steam under low pressure to chamber 58. A deflector 66 serves to distribute the delivered moist steam along the length of the shoe 47 and cause the same to sweep along the inside surfaces of the sidewalls 53 and 55. The moist steam is discharged from the shoe 47 through elongated slots 68a and 68b which extend across the entire width of the films 11 and 13.

The number of slots such as 68a and 68b formed in he respective sidewalls 53 and 55 of the shoe may be varied and a volatile monohydroxy alcohol containing an additive amount of an adhesion promoting polyalkyleneimine is incorporated by injection into the moist steam before or as it is being delivered into the shoe 47 as shown at 70 from a reservoir, not shown.

The temperature to which the shoe 47 is heated will, of course, vary with such factors as the nature of the sheets being laminated, the particular thermoplastic coating or surface materials, the speed of the sheets, etc. The sheets 11 and 13 should be directed close to the tapered sides of the shoe 47 although it is preferred that they be kept spaced from the sides of the shoe 47 at all times to avoid damage to the thermoplastic surfaces thereof.

The curved spreader rolls 27 and 29 are of conventional construction and, as heretofore mentioned, serve to remove wrinkles and folds from the humidified films by stretching the same laterally. As will be apparent from FIG. 1 of the drawing, the rolls 27 and 29 maintain the films 11 and 13 in laterally spread conditions until they are pressed together by the temperature and pressure rollers.

The temperature roller 31 is of known steel construction and is advantageously heated by a hot fluid circulated through the interior to help prevent formation of condensation of the moist steam on the roller surface. The cooperating pressure roller 33 is also of conventional construction and includes an outer cover 72 of silicone rubber or other heat-resistant resilient materials.

The laminated product 35 which issues from between the roller 31 and 33, is rapidly cooled by chill rolls 37 and 39. As illustrated, the laminated product 35 is wrapped about a substantial portion of the chill roll 37 by an idler roll 74 to provide for rapid and extensive cooling thereof. The chill rolls 37 and 39 are of conventional steel construction through which refrigerated water or other cool liquids may be circulated. Upon leaving the chill roll 37, the laminated product 35 is passed about the rubber-covered gripping or pull roll 41 and is then collected as a roll, as shown at 43.

While the apparatus as set forth above is advantageously used for carrying out the method of this invention, other devices which are useful for laminating films and sheets can also be employed. In addition, while the above device calls for the impinging of moist steam against the surfaces of the sheets, principally for humidification of hydrophilic lamina, dry steam can also be used where the sheets to be laminated do not require humidification. Other devices which can be used with slight modification for the method of this invention include those in which a molten thermoplastic film is extruded onto a traveling web as disclosed, for example, in U.S. Pat. Nos. 3,033,707 and U.S. 3,230,135. These devices may be modified to include means for impinging the steam, alcohol and polyalkyleneimine mixture on one or both surfaces just prior to the line at which they are joined, as in the nip between rollers whereby the films come together with the above mixture at the interface. Still other devices which, with slight modification, can be used in this invention are those shown in U.S. Pat. Nos. 3,364,091 and 3,365,348.

The volatile monohydroxy alcohols employed with this invention are normally liquid nonoily alcohols which boil below about 250° C. and include, for example, methyl alcohol, ethyl alcohol, propyl alcohol, isopropyl alcohol, butyl alcohol, isobutyl alcohol, amyl alcohol, hexyl alcohol, benzyl alcohol, etc. The preferred alcohol is benzyl alcohol based on a low odor level and its exceptional ability to readily mix with steam and soften thermoplastic surfaces. The amount of alcohol used ranges from about 1 to 20 percent based on the weight of steam, preferably from 3 to 10 percent.

The adhesion promoting polyalkyleneimines of this invention have been well described in the prior art patents as cited above and include, for example, polyethyleneimine, polypropyleneimine, polybuteneimine, polyisobuteneimine, poly N—methyleneimine, poly N—(beta–hydroxyethyl ethyleneimine; poly N—(fatty –acid)–ethyleneimine the fatty acid has from 6 to 22 carbon atoms, poly N—(ethylene oxide) ethyleneimine, and copolymers and quaternary ammonium salts thereof. The molecular weight range of the polyalkyleneimines which is useful is from about 1,000 up to about 500,000 and preferably above 10,000 up to about 250,000. The most desirable polyalkyleneimine and its molecular weight will depend on the amount employed, the alcohol solvent, its availability, its cost and the chemical nature of the sheets to be laminated. For most applications, an unsubstituted polyethyleneimine within the preferred molecular weight range will be satisfactory and economically preferred. The polyalkyleneimines are generally used in amounts of about 0.25 to about 5 percent, preferably from 0.5 to 2 percent based on the weight of the monohydroxy alcohol used.

The sheets which are laminated in accordance with this invention are well known and include for example, regenerated cellulose film, polyolefin films, polyester films, polyamide films, polycarbonate films, polyphenyleneoxide films, polyoxymethylene films, vinyl resin films, saran (vinylidene chloride copolymer) films, acrylic films and fibrous webs, e.g. paper, glassine, boards and the like. At least one of the sheets, and preferably both, should have nonfibrous thermoplastic surfaces, generally of different chemical constituencies, which surfaces are to be bonded together in accordance with the invention.

Nonthermoplastic sheets such as paper, glassine, regenerated cellulose film, hydroxyethyl cellulose ether film can be bonded to thermoplastic sheets or thermoplastic coated sheets in accordance with this invention but it is preferred that such sheets have been previously coated with thermoplastic compositions, for example, as mentioned above.

To demonstrate this invention the following examples are set forth.

EXAMPLE I

Two rolls of films were laminated using the modified Conti-Pepmeier apparatus described in the accompanying drawing. One of the rolls comprised a saran-coated regenerated cellulose film and the other comprised thermoplastic acrylic resin coated polypropylene film. The saran surface of the regenerated cellulose film and the acrylic surface of the polypropylene film were in opposed relationship and the films were brought to a traveling speed of about 350 feet per minute. Both film surfaces were heated by their proximity to the heated shoe 47 which was maintained at about 150° C. for this operation. Moist steam was passed through pipe 64 having an internal diameter of about three-fourths inch at a pressure of about 15 p.s.i. and benzyl alcohol containing about 1.0 weight percent polyethyleneimine having an average molecular weight between 30,00 and 40,000 was injected into the steam through tube 70 which has an internal diameter of about one-eighth to three-sixteenths of an inch at a feed rate, through pump P, of about 1 gallon an hour. This provided a concentration of benzyl alcohol in the steam of about 3 to 5 percent by weight. The steam, alcohol and polyethyleneimine mixture was impinged against the saran surface of the regenerated cellulose film through slot 68a in the side of the heated shoe, slot 68b being closed off. The films were brought together, pressed with rollers, one of which was maintained at about 100° C. and then cooled to produce a clear composite sheet with strongly adhering lamina.

When the surfaces of the sheets are brought together and heat pressed the remaining steam and some of the alcohol are flashed off. Moisture from the steam has rehumidified the regenerated cellulose base film and the polyethyleneimine and remaining alcohol become absorbed on the thermoplastic surfaces requiring no drying. This type of application apparently activates the polyalkyleneimine so that predrying is unnecessary.

Previous laminating runs, with the same films and under the same conditions with impingement of either moist steam alone or moist steam containing benzyl alcohol as a softener did not produce a composite sheet wherein a strong, clear joint was produced at the interface of the thermoplastic surfaces. Furthermore, runs with these same films under the same conditions wherein steam containing only the polyethyleneimine at the same and higher additive levels as above did not produce a strong, clear joint between these surfaces. A strong, clear lamination of a saran surface to a thermoplastic acrylic surface had not been obtained by the above method until the mixture of steam and alcohol with an additive amount of polyalkyleneimine was used.

While the saran to acrylic bond is difficult to achieve and requires the new procedure described herein to accomplish satisfactorily, laminations of other materials wherein he bond is accomplished using prior methods, can also be advantageously accomplished by the new method described herein.

It has been noted that the present method also gives overall even bonding or printed sheets so that the level of adhesion in clear unprinted areas, is at least equal to the level of adhesion in the printed areas where the printing ink itself contributes to adhesion.

We claim:

1. A method of laminating two sheets together at least one of which has a nonfibrous thermoplastic resin surface comprising forwarding said sheets with the thermoplastic surface in opposed relationship to the other sheet into contact with another, impinging a mixture of steam and a volatile monohydroxy alcohol containing an additive amount of an adhesion promoting polyalkyleneimine onto at least one of said surfaces just prior to said contact, and pressing said sheets together to provide a composite product.

2. The method of claim 1 wherein both of said sheets have thermoplastic surfaces in opposed relationship to each other and said thermoplastic surfaces are heat softened by passing said surfaces in proximity to a stationary heated member prior to contacting one another.

3. The method of claim 1 wherein the volatile monohydroxy alcohol is benzyl alcohol.

4. The method of claim 1 wherein the polyalkyleneimine is polyethyleneimine.

5. The method of claim 1 wherein at least one of said two sheets contains a hydrophilic cellulosic sheet.

UNITED STATES PATENT OFFICE
CERTIFICATE OF CORRECTION

Patent No. 3,607,544  Dated September 21, 1971

Inventor(s) Richard J. Earner

It is certified that error appears in the above-identified patent and that said Letters Patent are hereby corrected as shown below:

Col. 1, line 43, delete one of the commas; line 62, after "is" insert --a--; line 68, "adhesive" should read --adhesion--. Col. 2, line 49, "1" should read --51--. Col. 3, line 68, insert ")" after "N-(beta-hydroxyethyl"; line 69, after "ethyleneimine" (2nd. occurrence), and before "the" insert --wherein--; Col. 6, line 2, after "with" insert --one--.

Signed and sealed this 21st day of March 1972.

(SEAL)
Attest:

EDWARD M. FLETCHER, JR.
Attesting Officer

ROBERT GOTTSCHALK
Commissioner of Patents